(12) United States Patent
Hämäläinen (10) Patent No.: US 7,245,670 B2
(45) Date of Patent: Jul. 17, 2007

(54) METHOD FOR CHANNEL EQUALIZATION, A RECEIVER A CHANNEL EQUALIZER, AND A WIRELESS COMMUNICATION DEVICE

(75) Inventor: Ari Hämäläinen, Vantaa (FI)

(73) Assignee: Nokia Corporation, Espoo (FI)

( * ) Notice: Subject to any disclaimer, the term of this patent is extended or adjusted under 35 U.S.C. 154(b) by 685 days.

(21) Appl. No.: 10/025,119

(22) Filed: Dec. 19, 2001

(65) Prior Publication Data
US 2002/0114408 A1    Aug. 22, 2002

(30) Foreign Application Priority Data
Dec. 21, 2000  (FI)  .................................. 20002819

(51) Int. Cl.
*H03K 9/00*    (2006.01)
(52) U.S. Cl. ...................................... 375/316
(58) Field of Classification Search ................ 375/229, 375/230, 231, 232, 233, 235, 350, 341, 265, 375/329, 316, 340, 239; 714/795, 796, 786, 714/794; 708/322
See application file for complete search history.

(56) References Cited

U.S. PATENT DOCUMENTS

| | | | | |
|---|---|---|---|---|
| 5,483,557 A | * | 1/1996 | Webb | 375/349 |
| 5,727,032 A | | 3/1998 | Jamal et al. | |
| 5,887,035 A | * | 3/1999 | Molnar | 375/340 |
| 5,970,239 A | * | 10/1999 | Bahl et al. | 704/245 |
| 6,100,835 A | * | 8/2000 | Hamilton | 341/155 |
| 6,182,261 B1 | * | 1/2001 | Haller et al. | 714/758 |
| 6,307,901 B1 | * | 10/2001 | Yu et al. | 375/341 |
| 6,327,302 B1 | * | 12/2001 | Shen | 375/232 |
| 6,404,809 B1 | * | 6/2002 | Zhang | 375/232 |
| 6,512,802 B1 | * | 1/2003 | Olivier et al. | 375/329 |
| 6,539,067 B1 | * | 3/2003 | Luschi et al. | 375/340 |
| 6,567,481 B1 | * | 5/2003 | Molnar | 375/341 |
| 6,636,650 B1 | * | 10/2003 | Long et al. | 382/295 |
| 6,674,820 B1 | * | 1/2004 | Hui et al. | 375/346 |
| 6,700,919 B1 | * | 3/2004 | Papasakellariou | 375/130 |

FOREIGN PATENT DOCUMENTS

| | | |
|---|---|---|
| EP | 0 954 142 A | 11/1999 |
| EP | 0959580 | 11/1999 |
| EP | 1 052 820 A | 11/2000 |
| WO | 99/55047 | 10/1999 |
| WO | WO 00 69134 A | 11/2000 |

OTHER PUBLICATIONS

"Turbo Equalisation for the Enhanced GPRS System", M. Pukkila, 11th IEEE International Symposium on Personal Indoor and Mobile Radio Communications,. (Proceedings), PIMRC 2000, London, Sep. 18-21, 2000, published pp. 893-897, vol. 2, XP002203461, IEEE USA ISBN: 0-7803-6463-5.

* cited by examiner

*Primary Examiner*—Emmanuel Bayard (57) ABSTRACT

The invention relates to a method for channel equalization in a receiver, in which a signal is received from a communication channel, the signal containing symbols formed of binary information by phase shift keying. In the receiver, channel estimation is performed to estimate the properties of the communication channel, and samples are taken of the received signal at intervals. In the method, a determined number of samples is examined at the time, and a decision step is taken, in which, to find out the transmitted symbols, bit decisions are computed on the basis of said determined number of samples. After each decision step, it is examined, whether said decision step is to be iterated. Upon iteration of said decision step, at least some of the bit decisions of the preceding decision step are used in addition to the samples under examination at the time, for computing the bit decisions.

18 Claims, 3 Drawing Sheets

METHOD FOR CHANNEL EQUALIZATION, A RECEIVER A CHANNEL EQUALIZER, AND A WIRELESS COMMUNICATION DEVICE

FIELD OF THE INVENTION

The present invention relates to a method for performing channel equalization in a receiver, in which a signal is received from a communication channel, the signal containing symbols formed of binary information by phase shift keying, channel estimation is performed to estimate the properties of the communication channel, and samples are taken of the received signal at intervals. The invention also relates to a receiver comprising means for receiving a signal from a communication channel, the signal containing symbols formed of binary information by phase shift keying, a channel estimator for estimating the properties of the communication channel, a channel equalizer, and means for sampling the received signal at intervals. The invention further relates to a channel equalizer comprising means for sampling a signal received from a communication channel at intervals, which received signal contains symbols formed of binary information by phase shift keying, and which received signal has been subjected to channel estimation for estimating the properties of the communication channel. The invention yet relates to a wireless communication device comprising means for receiving a signal from a communication channel, the signal containing symbols formed of binary information by phase shift keying, a channel estimator for estimating the properties of the communication channel, a channel equalizer, and means for sampling the received signal at intervals.

BACKGROUND OF THE INVENTION

In radio communication, information to be transmitted is converted in a modulator to a high-frequency radio signal which is transmitted via a communication channel, i.e. a radio channel, to a receiver. In the receiver, the received radio-frequency signal is demodulated, wherein the aim is to use the received high-frequency signals to form the information which substantially corresponds to the original information.

However, this communication based on radio signals is susceptible to noise which can be due to e.g. high-frequency signals caused by other electric devices, changes in the conditions of the communication channel, bars affecting the propagation of radio signals, such as buildings, trees, topography, etc. Methods have been developed to reduce the effect of such noise. In systems, in which the modulation method used is based on phase shift (M-ary Phase Shift Keying, MPSK), receivers commonly apply a channel estimator and a channel equalizer to compensate for changes caused by the communication channel in the signal. The aim of a channel estimator is to determine the transfer function of the communication channel effective on the propagation of the radio signal, wherein it is possible in the channel equalizer to make a correction in the received signal on the basis of this determined transfer function. As the channel equalizer, e.g. the maximum likelihood sequence equalizer (MLSE) and the Viterbi algorithm can be used. With such an arrangement, the effects of the communication channel can be compensated for, to at least some extent. However, such an arrangement involves e.g. the problem that the complexity of the system increases exponentially the higher, the more channel taps are determined from the transfer function in the channel estimator. On the other hand, the more channel taps can be estimated, the better it is possible to compensate for distortions in the signal which are due to e.g. multipath propagation. In a formula, the complexity of the system can be depicted by $M^H$, in which H is the number of estimated channel taps and M is the number of different phase-shift alternatives to be used in the modulation.

As the radio signal is reflected from obstacles, such as buildings, vegetation, topography, etc., it causes so-called multipath propagation, wherein the same signal comes to the receiver along several different paths. Since these different signal paths can have different lengths and they are longer than the distance travelled by the signal directly from the transmitter to the receiver, the signals propagating along different paths are received by the receiver at different times. Furthermore, such a multipath-propagated signal can be stronger than the directly propagated signal, wherein signals which have come to the receiver along different paths cannot be differentiated from each other solely on the basis of the signal strength. Particularly in said phase modulation, multipath propagation has a significant effect on the performance of the receiver. In principle, for example four-tap estimation can be used to compensate for four multipath-propagated signals which come to the receiver at different times. However, receivers of prior art are thus very complex compared to a situation in which for example one-tap estimation is used.

The following is a brief discussion of the transmission of binary information by using phase shift keying. Let us fix the time index t to $t=\tau+t\Delta\tau$ in which $\Delta\tau$ is the symbol transmission interval. The symbol $S(B_t)$ corresponds to three bits $B_t = \lfloor b_{t,1}, b_{t,2}, b_{t,3} \rfloor$ at time $t(b_{t,k} \in \{0,1\})$, when 8PSK modulation is applied. Thus, the symbol generator can be presented by the formula $$S(B) = a^2(1-b_1)b_2b_3 + a^4(1-b_1)b_2(1-b_3) + a^6(1-b_1)(1-b_2)(1-b_3) + a^8(1-b_1)(1-b_2)b_3 + a^{10}b_1(1-b_2)b_3 + a^{12}b_1(1-b_2)(1-b_3) + a^{14}b_1b_2(1-b_3) + a^{16}b_1b_2b_3 \quad (1)$$

where $a = e^{j2\pi/16}$.

The symbols are transmitted to the communication channel. In the receiver, the signal to be received at time t is $$r_t = \sum_{s=0}^{H-1} \tilde{h}_s S(B_{t-s}) + n_t \quad (2)$$

in which $\tilde{h}_s$ indicates H channel taps and $n_t$ indicates channel noise which is assumed to be Gaussian noise.

An optimal channel equalizer would be one that maximizes the likelihood function. If it is assumed that the noise mixed with the signal is Gaussian noise and the probability of all the symbols S is equal, then the maximization of the likelihood functions corresponds to the minimization of the function $$f(B) = \sum_{t=0}^{T} \left\| r_t - \sum_{s=0}^{H-1} h_s S(B_{t-s}) \right\|^2 \quad (3)$$

in which S(B) is the symbol corresponding to bits B, $h_s$ are the estimated channel coefficients, and r is the received signal. Consequently, the problem is to find the bits B after receiving r and estimating h. In the above formula, T+1 is the number of transmitted symbols, H indicates the number of channel taps, and s is the tap index. To simplify the notations, time index t indicates the value u+tΔu in which u is time and Δu is the sampling interval. The function f can be minimized by using the Viterbi algorithm. However, the problem is that the complexity of the Viterbi algorithm increases exponentially as the function of the number of channel taps H, as already mentioned above. Another method is to first use a prefilter to reduce the number of channel taps to for example two and, after this, to apply the Viterbi algorithm to maximize the likelihood function. However, this method has the drawback that the result depends e.g. on the quality of the prefilter and the type of the channel. One method applying the Viterbi algorithm is based on the use of a delayed decision-feedback sequence estimator (DDFSE). In this method, the Viterbi algorithm is applied in the feedback filter. The performance of such a sequence estimator is affected by e.g. the number of states used in Trellis coding. If the number of states is sufficiently large, the performance is close to the optimum, but the estimator is thus very complex. Such an estimator operates the better, the smaller the phase shift in the channel, wherein the estimator requires a filter whereby this phase shift can be reduced.

SUMMARY OF THE INVENTION

It is an aim of the present invention to provide an improved method for channel equalization, as well as a channel equalizer. To apply the method of the invention, an iterative algorithm has been developed to minimize the function f. More precisely, the method according to the present invention is primarily characterized in that in the method, a determined number of samples are examined, a decision step is taken, in which, to find out the transmitted symbols, the bit decisions are computed on the basis of said defined quantity of samples, and after each decision step it is examined whether said decision step is to be iterated, wherein upon iteration of said decision step, at least some of the bit decisions of the previous decision step are used in addition to the samples under examination, in the computation of the bit decision. The receiver according to the present invention is primarily characterized in that the channel equalizer comprises means for examining a number of samples defined at the time, decision means for computing bit decisions on the basis of said defined number of samples to find out the transmitted symbols, and examining means for estimating the need for iterating the computation of the bit decisions, wherein upon iterating said computation of bit decisions, at least some of the bit decisions of the previous decision step are arranged to be used in addition to the samples under examination at the time. The channel equalizer according to the present invention is primarily characterized in that the channel equalizer comprises means for examining a number of samples defined at a time, decision means for computing bit decisions on the basis of said defined number of samples to find out the transmitted symbols, and examining means for estimating the need for iterating the computation of the bit decisions, wherein upon iterating said computation of bit decisions, at least some of the bit decisions of the previous decision step are arranged to be used in addition to the samples under examination at the time. Further, the wireless communication device according to the present invention is primarily characterized in that the channel equalizer comprises means for examining a number of samples defined at the time, decision means for computing bit decisions on the basis of said defined number of samples to find out the transmitted symbols, and examining means for estimating the need for iterating the computation of the bit decisions, wherein upon iterating said computation of bit decisions, at least some of the bit decisions of the previous decision step are arranged to be used in addition to the samples under examination at the time.

The present invention shows remarkable advantages when compared to solutions of prior art. Applying the method of the invention, the structure of the channel equalizer is simpler than with prior art solutions, as the number of channel taps is increased. The channel equalizer according to the invention can also be implemented as an integrated circuit, wherein the size of the device applying the channel equalizer can be reduced and its manufacture is less expensive than the manufacture of electronic devices applying channel equalizers of prior art. The simpler implementation also provides that the power consumption can be reduced, which is particularly advantageous in portable electronic devices.

BRIEF DESCRIPTION OF THE DRAWINGS

In the following, the invention will be described in more detail with reference to the appended drawings, in which.

DETAILED DESCRIPTION OF THE INVENTION

Figure 1:
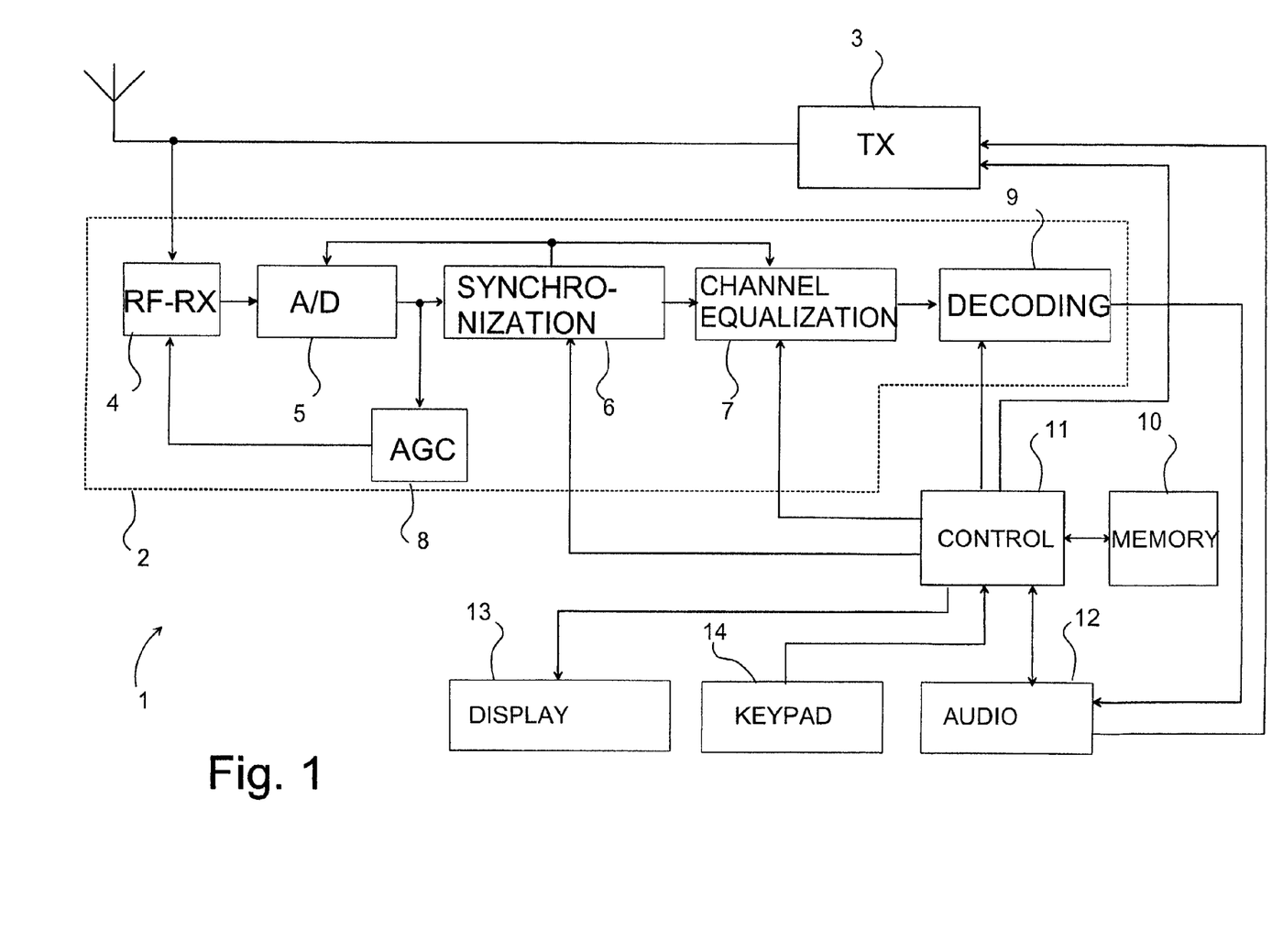
FIG. 1 shows an electronic device, in connection with which the channel equalizer according to the invention can be applied.

In the following description of the method according to an advantageous embodiment of the invention, a wireless communication device with a receiver 2 and a transmitter 3 for radio-frequency communication will be used as an example of an electronic device 1. As the modulation method, M-ary phase shift keying M PSK will be used, such as 8 PSK (M=8). In such phase shift keying, eight different phase shift values are available for symbol formation, wherein one symbol can be used to transmit the information of three bits ($2^3$). Generally in phase shift keying, the letter M indicates the involution of two $2^N$, in which N is greater than 0. Such an 8 PSK modulated signal has been proposed for example for the GSM-EDGE system, but it is obvious that the invention can also be applied in connection with other phase shift modulation methods and other communication systems applying phase shift modulation.

The receiver 2 comprises a high-frequency part 4, in which the received high-frequency signal is converted either to an intermediate-frequency signal or directly to the baseband. The signal formed in the high-frequency part 4 is converted to digital format by sampling in an analog-to-digital converter 5. These samples are stored in a memory 10 for further processing steps. On the basis of these samples, the receiver 2 is synchronized with the received signal in a synchronization block 6. Here, so-called training sequences can be utilized, which are transmitted with payload information to the receiver 2. Such a training sequence and its location in relation to the payload information is also known in the receiver 2, wherein the receiver can search for these training sequences in the received signal e.g. by a correlation method. The synchronization block 6 can also be used to control the timing of the analog-to-digital converter 5. An automatic amplification control block 8 can be used to control the amplification of the high-frequency part 4, if necessary, wherein variations in signal strength can be compensated for, to at least some extent. The received, digitized signal is transmitted to a channel equalizer 7 in which the received signal is subjected to equalizing operations to compensate, as well as possible, for changes in signal propagation due to the radio channel. The channel equalizer 7 also comprises a channel estimator 17 (FIG. 2a) for estimating the properties of the communication channel, i.e. for finding out the transfer function of the communication channel. Subsequently, the channel-coded signal is directed to a decoder 9 for decoding. The function of the decoder 9 is to find out from the received signal the original information transmitted in the signal, after which the received information is led to further processing steps in a way known as such.

The following is a mathematical description of the computing algorithm to be used in the method according to the invention. For clarity, it is assumed in the description that 8 PSK modulation (M=3) is involved, wherein the symbol value is determined by three bits, but the principles to be presented below can also be applied in other M PSK encodings. The purpose of the computing algorithm is to minimize the function f(B) presented in formula (3) in an iterative manner. To facilitate the description, two terms are added in the cost function (3), resulting in the cost function $$f(B) = \frac{1}{2} \sum_{t=0}^{T} \left( \left\| r_t - \sum_{s=0}^{H-1} h_s S(B_{t-s}) \right\|^2 - \sum_{s=0}^{H-1} \bar{h}_s h_s \bar{S}(B_{t-s}) S(B_{t-s}) + \sum_{k=1}^{M} \left( b_{t,k} - \frac{1}{2} \right)^2 \right) \quad (4)$$

in which the reference $\bar{x}$ indicates the complex conjugate of x. Since the terms b are binary, they have a constant value. Thus, the minimum of the function (4) corresponds to the minimum of the function (3). Taking the derivative of f(B) according to formula (4) with respect to $b_{l,k}$ (l=t−s), we get that $$\frac{\Delta f(B)}{\Delta b_{l,k}} = b_{l,k} - \frac{1}{2} + \sum_{t=l}^{l+H-1} \left( -re\left\{ \bar{r}_t h_{t-l} \frac{\Delta S(B_l)}{\Delta b_{l,k}} \right\} + re\left\{ \bar{h}_{t-l} \frac{\Delta \bar{S}(B_l)}{\Delta b_{l,k}} \sum_{q=0, t \neq l}^{H-1} h_q S(B_{t-q}) \right\} \right) \quad (5)$$

in which the reference re{x} indicates the real part of x.

Now, using the gradient descent and requiring that b is either 0 or 1, we get that $$b_{l,k}(j+1) = g_h\left( b_{l,k}(j) - \alpha \frac{\Delta f(B_l)}{\Delta b_{l,k}} \right) \quad (6)$$

where j refers to iteration number and $g_h(x)=1$, if x>0.5, else 0.

Setting α=1, we get the update rule for the bit $b_{l,k}$, (k=1, 2, 3; l is an index):

$$b_{l,k}(j+1) = f_h\left( \sum_{t=l}^{l+H-1} re\left\{ \bar{r}_t h_{t-l} \frac{\Delta S(B_l)}{\Delta b_{l,k}} \right\} - re\left\{ \bar{h}_{t-l} \frac{\Delta \bar{S}(B_l)}{\Delta b_{l,k}} \sum_{q=0, t \neq l}^{H-1} h_q S(B_{t-q}) \right\} \right) \quad (7)$$

where $B_l=[b_{l,1},b_{l,2},b_{l,3}]$ are three bits at time l=u+lΔu, $S(B_l)$ is the corresponding symbol, $S(B_l)$ is the derivative with respect to k bits, h indicates the communication channel, of which H channel taps are estimated (H-path channel), and $f_h(x)$ is a hard limit function which receives the value 1, if x>0, else 0. In the general case, $B_l=[b_{l,1},b_{l,2},\ldots,b_{l,M}]$. The symbols S are complex numbers, and re{ } indicates taking the real part. To compute the iteration step to be taken by the update rule according to this function, it is possible to select how long a signal is to be examined. For example, a period of 5H can be examined, i.e. l=0, . . . , 5H−1.

The description S is defined, as presented in formula (1), in such a way that $$S(B_l)=a^2(1-b_{l,1})b_{l,2}b_{l,3}+a^4(1-b_{l,1})b_{l,2}(1-b_{l,3})+a^6(1-b_{l,1})(1-b_{l,2})(1-b_{l,3})+a^8(1-b_{l,1})(1b_{l,2})b_{l,3}+a^{10}b_{l,1}(1-b_{l,2})b_{l,3}+a^{12}b_{l,1}(1-b_{l,2})(1-b_{l,3})+a^{14}b_{l,1}b_{l,2}(1-b_{l,3}) + a^{16}b_{l,1}b_{l,2}b_{l,3} \quad (8)$$

where a=exp(i2π¹/₁₆). The bit values are initialized for example randomly. Because binary optimization is involved, the method may be stuck in a local minimum. However, this can be prevented by adding noise whose variance is reduced during convergence, to the iteration. Furthermore, several initializations can be used.

Figures 2A, 2B:
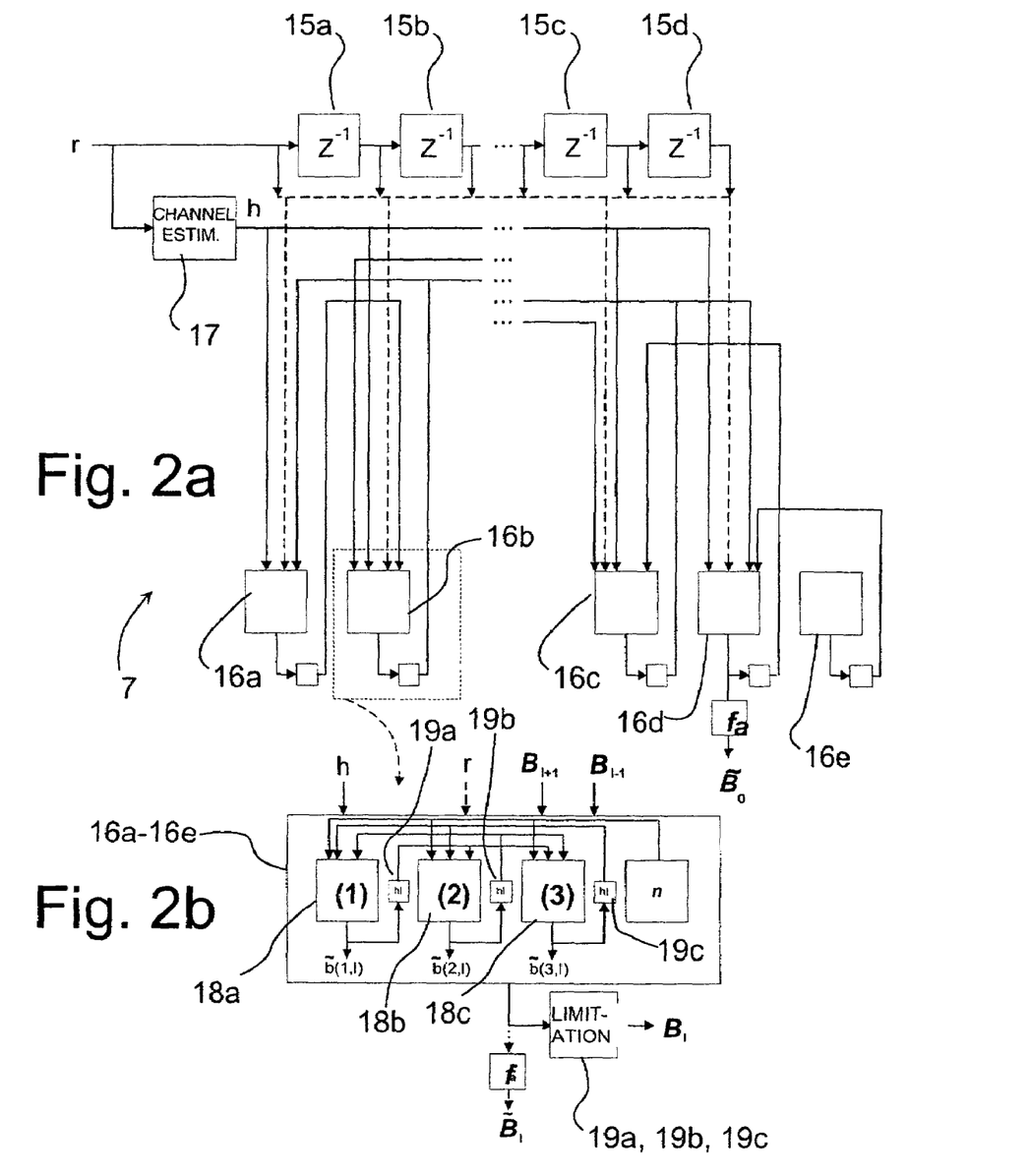
FIG. 2a shows a channel equalizer according to a preferred embodiment of the invention in a reduced block chart.
FIG. 2b shows a computing block for use in the channel equalizer of FIG. 2a, in a reduced block chart.

The structure of a channel equalizer 7 complying with a preferred embodiment of the invention is shown in the appended FIG. 2a. To start the operation, the states $b_{l,k}$ are set for example randomly. The sampled signal r which is delayed in delay blocks 15a–15d of a delay line, is led to the channel equalizer 7. Furthermore, channel coefficients are estimated from the signal in the channel estimator 17 which forms a vector h. After the required number (in this example 5H) of samples has been led to the channel equalizer 7, the iteration step is started. Thus, the values of the vector h as well as the sample values of the sampled signal r, delayed in the delay blocks 15a–15d, are input in computing units 16a–16e, one of which is shown in more detail in FIG. 2b. Further, the bit decisions B of the neighbouring computing units, whose values at the first iteration time are the values determined at the initialization stage, are input in the computing unit.

The computing units 16a–16e contain a number corresponding to the term M of iteration blocks, in this example three iteration blocks 18a, 18b, 18c, each of which implements the iteration step according to the above formula (7), except for the hard limit function $f_h$, that is $$\tilde{b}_{l,k}(j+1) = \sum_{t=l}^{l+H-1} re\left\{\tilde{r}_t h_{t-l} \frac{\Delta S(B_l)}{\Delta b_{l,k}}\right\} - \qquad (9)$$

$$re\left\{\overline{h}_{t-l} \frac{\Delta \overline{S}(B_l)}{\Delta b_{l,k}} \sum_{q=0, t \neq q \neq l}^{H-1} h_q S(B_{t-q})\right\} + AWGN$$

where k=1, 2, 3 and AWGN refers to Gaussian noise. The hard limit function is implemented by means of hard limit blocks 19a, 19b, 19c. In the references of FIG. 2b, the character ~ on top of a symbol indicates the decision value before performing the hard limit function. The iteration blocks 18a, 18b, 18c are coupled to each other in such a way that their output is led to the other iteration blocks 18a, 18b, 18c in the same computing unit 16a–16e preferably through the hard limit blocks 19a, 19b, 19c, but not to the input of the same iteration block; that is, there is no feedback in the iteration blocks 18a–18c. The block n forms random noise which is input in the iteration blocks 18a, 18b, 18c of the computing unit, if necessary. Preferably, the variance of the added noise should reduce during the step of stabilization. Furthermore, the output of all the three limiting blocks 19a, 19b, 19c in the computing block is preferably input in at least one, preferably neighbouring computing unit 16a–16e. The number of computing units 16a–16e in which the output is input, depends on the number of channel taps. After the computing blocks 16a–16e have computed the bit value of one iteration step, the hard limit function $f_h$ is computed in the hard limit block 19a, 19b, 19c which makes the bit decisions B of the computing blocks at the respective iteration round. After this, it is examined, for example in the control block 11, whether the state of the channel equalizer 7 is stabilized, or if there is still a need to iterate the computation of the bit decisions. If it is noticed that the state is not yet sufficiently stable, a new round of iteration computing is performed, in which the bit decisions formed in the previous iteration round are now used as the bit decisions B. Stabilization can be examined for example by comparing the bit decisions of the previous iteration round to the bit decisions of the latest iteration round, wherein if the bit decisions have remained the same, it can be assumed that the channel equalizer 7 is stabilized.

After the channel equalizer has been stabilized, a channel-equalized binary signal can be obtained from the hard limit blocks of the channel equalizer, for further processing. Thus, the output of each hard limit block contains the bit decision $B_l$ which is a vector containing the channel-equalized binary values corresponding to the symbol $r_l$.

From the computing units 16a–16e it is also possible to take so-called soft decisions $\tilde{B}_0$ by using an activation function $f_a$ which can be for example a sigmoid function. Soft decisions are advantageous in decoding of bits.

The channel equalizer 7 shown in FIGS. 2a and 2b can be primarily implemented by programming e.g. in a digital signal processor (DSP) which can be e.g. a part of the control block 11. Furthermore, a memory is needed in the operation of the channel equalizer 7, for storing the bit decisions made at the iteration rounds. The channel equalizer 7 can also be implemented as an integrated circuit.

Figure 3:
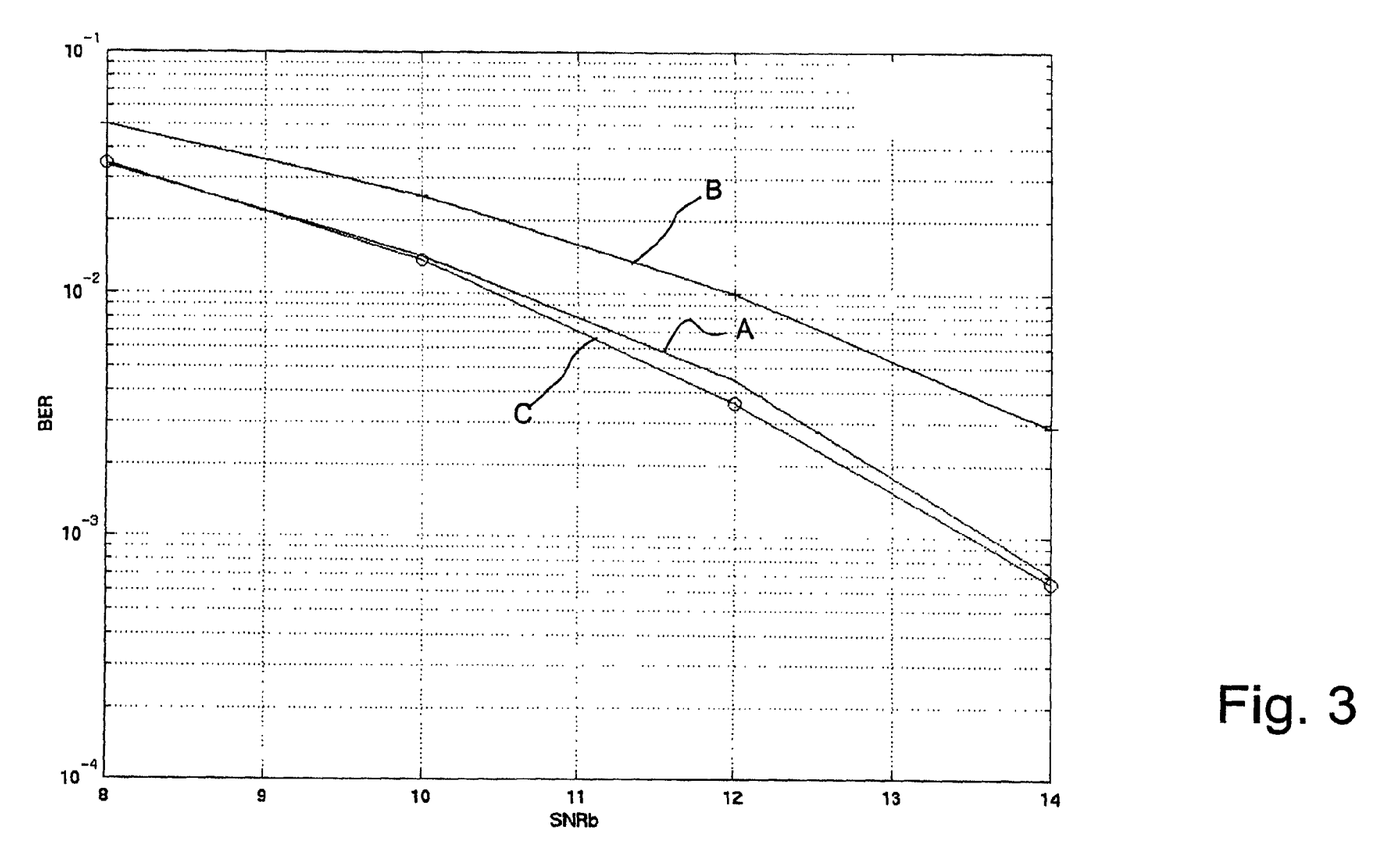
FIG. 3 illustrates comparison of simulation results obtained with different types of channel equalizers.

Further, FIG. 3 shows simulation results comparing the method according to an advantageous embodiment of the invention with methods of prior art. The method according to an advantageous embodiment of the invention has been tested with a complex 4-path channel. The channel coefficient h is estimated from a training sequence of 100 bits. Also, parameters of a delayed decision-feedback sequence estimator (DDFSE) according to prior art are estimated from the corresponding sequence. Noise has been added during the iteration. The result shows that in this test, the new method (curve A) is clearly better than the reference method (curve B). The number of iterations was 50. The dotted line (curve C) shows the result obtained with the method according to the invention by initializing the bit values b with the real values, by eliminating the added noise and letting the equalizer stabilize. This is very close to the performance of the Viterbi algorithm.

It is obvious that the present invention is not limited solely to the above-presented embodiments, but it can be modified within the scope of the appended claims.

The invention claimed is:

1. A method comprising:
receiving a signal from a communication channel, the signal containing symbols formed of binary information by phase shift keying;
performing channel estimation to estimate the properties of the communication channel;
taking samples of the received signal at intervals;
examining a determined number of samples;
performing a computation of bit decisions, to find out the transmitted symbols, on the basis of said defined number of samples, and
after each computation of bit decisions, examining computed bit decisions to determine whether said computation of bit decisions is to be iterated,
wherein upon iteration of said computation of bit decisions, using at least some of the bit decisions of the previous computation of bit decisions in addition to the samples under examination, in the computation of the bit decision.

2. The method according to claim 1, further comprising: for performing said computation of bit decisions, a cost function is used wherein $$f(B) = \frac{1}{2} \sum_{t=0}^{T} \left( \left\| r_t - \sum_{s=0}^{H-1} h_s S(B_{t-s}) \right\|^2 - \sum_{s=0}^{H-1} \overline{h}_s h_s \overline{S}(B_{t-s}) S(B_{t-s}) + \sum_{k=1}^{M} \left(b_{t,k} - \frac{1}{2}\right)^2 \right),$$

in which S(B) is the symbol corresponding to bits B, $h_s$ are the estimated channel coefficients, and r is the received signal which is sampled, and that said cost function $f(B)$) is subjected to minimization.

3. The method according to claim 2, wherein to minimize said cost function, said computation of bit decisions is iterated, and an update rule $$b_{l,k}(j+1) = f_h\left(\sum_{t=l}^{l+H-1} re\left\{\tilde{r}_t h_{t-l} \frac{\Delta S(B_l)}{\Delta b_{l,k}}\right\} - re\left\{\overline{h}_{t-l} \frac{\Delta \overline{S}(B_l)}{\Delta b_{l,k}} \sum_{q=0, t \neq q \neq l}^{H-1} h_q S(B_{t-q})\right\}\right),$$

is used, where $B_l = [b_{l,1}, b_{l,2}, \ldots, b_{l,M}]$ is M bits at the moment l=u+lΔu, $S(B_l)$ is the corresponding symbol, $$\frac{\Delta S(B_l)}{\Delta b_{l,k}}$$

is a derivative with respect to k bits, h indicates the communication channel, of which H channel taps are estimated, and $f_h(x)$ is a hard limit function which receives the value 1, if x>0, else 0.

4. The method according to claim 3, wherein in the update rule, noise is added before taking said computation of bit decisions.

5. A receiver comprising
a receiver configured to receive a signal from a communication channel, the signal containing symbols formed of binary information by phase shift keying,
a channel estimator configured to estimate the properties of the communication channel,
a channel equalizer, and
a sample configured to sample the received signal at intervals,
characterized in that channel equalizer comprises computing units configured to examine a number of samples defined at the time, iteration blocks configured to compute bit on the basis of said number of samples to find out the transmitted symbols, and examining block configured to examine computed bit decisions to determine whether said computation of bit decisions is to be iterated, wherein upon iterating said computation of bit decisions, said computing units are configured to use at least some of previous bit decisions in addition to the samples under examination at the time.

6. The receiver according to claim 5, wherein for computing said bit decisions, the channel equalizer is configured to minimize the cost function $$f(B) = \frac{1}{2}\sum_{t=0}^{T}\left(\left\|r_t - \sum_{s=0}^{H-1}h_s S(B_{t-s})\right\|^2 - \sum_{s=0}^{H-1}\overline{h}_s h_s \overline{S}(B_{t-s})S(B_{t-s}) + \sum_{k=1}^{M}\left(b_{t,k}-\frac{1}{2}\right)^2\right),$$

in which S(B) is the symbol corresponding to bits B, $h_s$ are the estimated channel coefficients, and r is the received signal which is sampled.

7. The receiver according to claim 6, characterized in that the iteration blocks are configured to compute the update rule $$b_{l,k}(j+1) = f_h\left(\sum_{t=l}^{l+H-1}\text{re}\left\{\bar{r}_t h_{t-l}\frac{\Delta S(B_l)}{\Delta b_{l,k}}\right\} - \text{re}\left\{\overline{h}_{t-l}\frac{\Delta \overline{S}(B_l)}{\Delta b_{l,k}}\sum_{q=0,t\neq q+1}^{H-1}h_q S(B_{t-q})\right\}\right)$$

where $B_{\bar{l}}=[b_{l,1},b_{l,2},\ldots,b_{l,M}]$ is M bits at the moment l=u+lΔu, $S(B_l)$ is the corresponding symbol, $$\frac{\Delta S(B_l)}{\Delta b_{l,k}}$$

is a derivative with respect to k bits, h indicates the communication channel, of which H channel taps are estimated, and $f_h(x)$ is a hard limit function which receives the value 1, if x>0, else 0.

8. The receiver according to claim 7, characterized in that it said computing units are configured to determine one symbol value on the basis of said defined number of samples, that the output of each computing unit is coupled to the input of at least one other computing unit, for using the symbol values defined by the computing units in the next computation of the bit decision.

9. The receiver according to claim 8, characterized in that each computing unit contains as many iteration blocks as the bit number of symbols formed in a modulation.

10. The receiver according to claim 5, characterized in that the computing units comprise a delay line in which the number of delays is one less than the number of symbols to be determined from said defined number of samples.

11. The receiver according to claim 7, characterized in that it comprises a noise generator for adding noise in the update rule before computing said bit decisions.

12. The receiver according to claim 5, characterizing in that it is configured to an initial valve for the bits before computing said bit decisions.

13. A channel equalizer comprising
a sampler configured to sample a signal received from a communication channel at intervals, which received signal contains symbols formed of binary information by phase shift keying, and which received signal has been subjected to channel estimation for estimating the properties of the communication channel,
computing units configured to examine a number of samples defined at a time,
iteration blocks configured to compute bit decisions on the basis of said number of samples to find out transmitted symbols, and
examining block configured to examine computed bit decisions to determine whether said computation of bit decisions is to be iterated, wherein upon iterating said computation of bit decisions, said computing units are configured to use at least some of previous bit decisions of the previous decision step are arranged to be used in addition to the samples under examination at the time.

14. A wireless communication device comprising
a receiver configured to receive a signal from a communication channel, the signal containing symbols formed of binary information by phase shift keying,
a channel estimator configured to estimate the properties of the communication channel,
a channel equalizer, and
a sampler configured to sample the received signal at intervals,
wherein the channel equalizer comprises
computing units configured to examine a number of samples defined at the time, iteration blocks configured to compute bit decisions on the basis of said number of samples to find out transmitted symbols, and
examining block configured to examine computed bit decisions to determine whether said computation of bit decisions is to be iterated, wherein upon iterating said computation of bit decisions, computing units arrange at least some of previous bit decisions to be used in addition to the samples under examination at the time.

15. A receiver comprising
means for receiving a signal from a communication channel, the signal containing symbols formed of binary information by phase shift keying, a channel estimator for estimating the properties of the communication channel, a channel equalizer, and means for sampling the received signal at intervals, wherein the channel equalizer comprises means for examining a number of samples defined at the time, decision means for computing bit decisions on the basis of said number of samples to find out transmitted symbols, and examining means for estimating the need for iterating the computation of the bit decisions, wherein upon iterating said computation of bit decisions, at least some of the bit decisions previously computed are arranged to be used in addition to the samples under examination at the time.

16. A wireless communication device comprising means for receiving a signal from a communication channel, the signal containing symbols formed of binary information by phase shift keying, a channel estimator for estimating the properties of the communication channel, a channel equalizer, and means for sampling the received signal at intervals, wherein the channel equalizer comprises means for examining a number of samples defined at the time, decision means for computing bit decisions on the basis of said number of samples to find out transmitted symbols, and examining means for estimating the need for iterating the computation of bit decisions by examining computed bit decisions to determine whether said computation of bit decisions is to be iterated, wherein upon iterating said computation of bit decisions, said decision means are configured to use at least some of previous bit decisions in addition to the samples under examination at the time.

17. The receiver of claim 15, wherein an update rule is used, and wherein noise is added in the update rule before taking said computation of bit decisions.

18. The wireless communication device of claim 16, wherein an update rule is used, and wherein noise is added in the update rule before taking said computation of bit decisions.

* * * * *

UNITED STATES PATENT AND TRADEMARK OFFICE
CERTIFICATE OF CORRECTION

PATENT NO. : 7,245,670 B2
APPLICATION NO. : 10/025119
DATED : July 17, 2007
INVENTOR(S) : A. Hämäläinen It is certified that error appears in the above-identified patent and that said Letters Patent is hereby corrected as shown below:

At col. 8, line 27, please change "defined" to --determined--.

At col. 9, line 26, after "computer bit", insert --decisions--.

At col. 10, line 22, change "characterizing" to --characterized--;

at line 23, please change "valve" to --value--; and at line 42, please delete "of the previous decision step are arranged to be used".

Signed and Sealed this

Eighteenth Day of December, 2007

JON W. DUDAS
*Director of the United States Patent and Trademark Office*